United States Patent [19]

Mansir

[11] Patent Number: 5,422,525
[45] Date of Patent: Jun. 6, 1995

[54] SWITCHED RELUCTANCE MACHINE HAVING UNBALANCE FORCES COMPENSATION COILS

[75] Inventor: Hassan Mansir, Rockford, Ill.

[73] Assignee: Sundstrand Corporation, Rockford, Ill.

[21] Appl. No.: 269,235

[22] Filed: Jun. 30, 1994

[51] Int. Cl.$^6$ .................................................. G01B 7/14
[52] U.S. Cl. ................................. 310/179; 310/197; 310/269
[58] Field of Search ............................... 310/166–171, 310/179–183, 197, 254, 269

[56] References Cited

U.S. PATENT DOCUMENTS

| | | | |
|---|---|---|---|
| 4,099,076 | 7/1978 | Hucker | 310/183 |
| 5,294,857 | 3/1994 | Auinger et al. | 310/269 |
| 5,304,882 | 4/1994 | Lipo et al. | 310/269 X |
| 5,376,851 | 12/1994 | Lipo et al. | 310/179 |

OTHER PUBLICATIONS

An article entitled *Faults and Unbalance Forces in the Switched Reluctance Machine* by T J E Miller of SPEED Laboratory, University of Glasgow, G12, 8LT, UK (IEEE-I-AS 28th Annual Meeting, Toronto, Oct. 3–8, 1993).

*Primary Examiner*—Mark O. Budd
*Attorney, Agent, or Firm*—Jeffery J. Makeever

[57] ABSTRACT

A switched reluctance machine comprises a stator having an even plurality of salient stator poles, each of which having a stator winding disposed thereon and electrically coupled one to another to form diametrically opposed pole pairs which may be coupled to an external source of electrical energy, a rotor having an even plurality of salient rotor poles, and at least one compensation coil disposed on each of the rotor poles. The compensation coils are electrically coupled one to another to form diametrically opposed compensation pairs in which flows a flux generating current when one of the stator windings of a pole pair is either open of shorted. The flux generated equalizes the unbalance forces resulting from the faulted stator winding, thereby increasing the fault tolerant capability of the switched reluctance machine.

7 Claims, 11 Drawing Sheets

SWITCHED RELUCTANCE MACHINE HAVING UNBALANCE FORCES COMPENSATION COILS

FIELD OF THE INVENTION

The instant invention relates generally to switched reluctance machines, and more particularly to a switched reluctance machine having compensation coils on each rotor pole to reduce or eliminate the asymmetrical magnetic forces induced by a faulted stator phase winding or by air gap eccentricities.

BACKGROUND OF THE INVENTION

With the advancements of modern power electronics, the switched reluctance machine with its simple rugged design allowing high speed operation in harsh environments is beginning to be used in an ever widening variety of aerospace applications. The typical switched reluctance machine 18, as shown in cross section in FIG. 1, is an electronically controlled stepping motor that has salient poles on both the stator 48 (51, 53, 54, 55, 56, and 57) and rotor 20 (22, 24, 26, and 28). The stator 48 is provided with concentrated excitation windings 43, 45, 47, 49, 50, and 52 where the diametrically opposite poles 43 & 47, 45 & 49, and 50 & 52 are connected in series or in parallel to form an individual phase. FIG. 2 illustrates a typical series connection with associated drive circuitry including transistors 37 and 39, and diodes 33 and 35, and FIG. 3 a typical parallel connection. Various control methods exist for the switched reluctance machine to allow operation as a starter-generator, a variable speed motor drive, and in an actuator drive system to name but a few common examples.

The switched reluctance machine operates by energizing a stator pole pair 50 & 52 to create equal magnetomotive forces prior to alignment with the rotor poles 24 and 28 (see FIG. 1). This magnetomotive force produces a symmetrical flux distribution 58, and thus symmetrical magnetic forces which pull the rotor poles 24 and 28 into alignment with the energized stator poles 54 and 56. As the stator and rotor poles come into alignment (28 with 54, and 24 with 56), the stator pole pair is de-energized and the next pole pair is energized to continue the rotor rotation. Under normal operation, the flux distribution 58 is symmetrical due to the balance of the ampere-turns of the phase coils 50 and 52 for each stator pole pair 54 & 56 as illustrated schematically in FIG. 1, and graphically in FIG. 4 which shows the variation of flux across the air gap 44, $\phi_{44}$, and 46, $\phi_{46}$, of FIG. 1 as the rotor poles 24 and 28 rotate into and out of alignment with the energized stator poles 54 and 56.

If, however, one of the phase coils 50 (see FIG. 5) of the stator pole pair 54 & 56 has shorted turns (for the series connection of FIG. 2 or the parallel connection of FIG. 3), or if it were to become open circuited (for the parallel connection of FIG. 3), the magnetomotive forces would no longer be balanced, and the flux distribution 58 would lose its symmetry across air gaps 44 and 46 as illustrated schematically in FIG. 5 and graphically in FIG. 6. Under such conditions the switched reluctance machine's rotor 20 is subject to asymmetrical forces due to the difference of magnetic pull between the opposite poles of the faulted phase. These resultant forces are very high and periodic, and can lead to a total machine failure, especially when the switched reluctance machine has inherent mechanical imbalance. This problem is recognized and discussed by T. J. E. Miller of the SPEED Laboratory, University of Glasgow, in his paper entitled "FAULTS AND UNBALANCE FORCES IN THE SWITCHED RELUCTANCE MACHINE" presented at the IEEE-IAS 281th Annual Meeting, in Toronto, on Oct. 3–8, 1993. In this paper the use of differential voltage sensing, with search coils 5 and 7 (see FIG. 7) or without search coils (see FIG. 8), is proposed to detect these faults by sensing a differential voltage Vxy (see FIG. 7) or Vuv (see FIG. 8), and isolate the controller from them to avoid machine failure. While this method may be sufficient to avoid machine failure by shutting the switch reluctance machine down, it may not be suitable where continued operation of the machine is required.

The instant invention is directed to overcoming the above problems associated with a faulted stator phase-coil while still allowing operation of the switched reluctance machine.

SUMMARY OF THE INVENTION

It is a principle objective of the instant invention to provide a new and improved switched reluctance machine. More particularly, it is the objective of the instant invention to provide a switched reluctance machine which by novel means may continue to operate under various fault conditions, including an open or shorted stator winding which subjects the rotor to unbalance magnetic forces.

In a preferred embodiment, the switched reluctance machine comprises a stator having an even plurality of salient stator poles, each having a stator winding disposed thereon and electrically coupled one to another to form diametrically opposed pole pairs which may be coupled to an external source of electrical energy. The switched reluctance machine of the instant invention further comprises a rotor rotatably positioned within the stator having an even plurality of salient rotor poles, and at least one compensation coil disposed on each of the rotor poles. The compensation coils are electrically coupled one to another to form diametrically opposed compensation pairs.

Further in accordance with a preferred embodiment of the instant invention, the diametrically opposed pole pairs, when coupled to an external source of electrical energy, generate a magnetomotive force which produces a symmetrical flux distribution from the one of the stator poles of the excited pole pair, across the air gap to one of the rotor poles, through the compensation coil associated therewith, through the rotor to a diametrically opposed rotor pole, through the diametrically opposed compensation coil associated therewith, across the air gap to the diametrically opposed stator pole of the excited pole pair. This flux flowing through the compensation pair generates balanced electromotive forces in each of the compensation coils of the compensation pair. These electromotive forces, being balanced, have no effect on the symmetrical flux distribution. However, when an excited pole pair has a faulted stator winding, it produces a non-symmetrical flux distribution through the compensation pair which generates unequal electromotive forces in each of the compensation coils of the compensation pair. These unequal electromotive forces result in a current flow in the compensation pair.

Further in accordance with a preferred embodiment of the instant invention, this induced current flow generates a flux which increases the magnetic attraction between the faulted stator pole of the excited pole pair and the rotor pole aligning therewith. This induced current flow further generates a flux which decreases the magnetic attraction between the non-faulted stator pole of the excited pole pair and the rotor pole aligning therewith. The resultant magnetic attraction between the faulted stator pole and the aligning rotor pole, and the resultant magnetic attraction between the non-faulted stator pole and the aligning rotor pole are approximately equal. This equalizing effect of the magnetic forces of attraction by the compensation coils reduces significantly the risk of total machine failure, thereby increasing the fault tolerant capability of the switched reluctance machine.

In a highly preferred embodiment of the instant invention, the compensation coils comprise a single winding around the axial length of its associated rotor pole, positioned at a radially outer portion of the rotor pole.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 9:
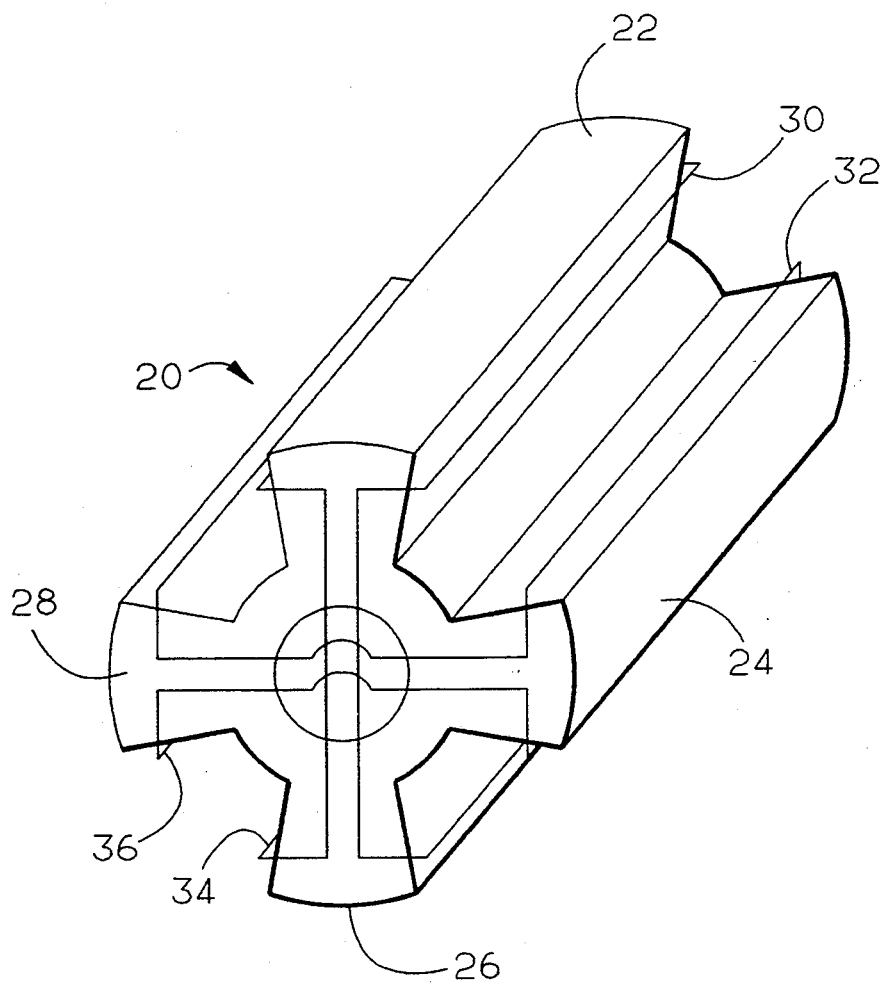
FIG. 9 is a three-dimensional view of a switched reluctance rotor in accordance with the instant invention.

A rotor 20 of a switched reluctance machine constructed in accordance with a preferred embodiment of the instant invention is illustrated in FIG. 9. The rotor 20 has an even plurality of salient poles 22, 24, 26, and 28, and at least one compensation coil 30, 32, 34, and 36 disposed on each of the salient rotor poles 22, 24, 26, and 28. Preferably, these coils 30, 32, 34, and 36 comprise a single winding around the axial length of the salient rotor pole at a radially outer portion. The compensation coils 30, 32, 34, and 36 are electrically coupled one to another to form diametrically opposed compensation pairs 30 & 34, and 32 & 36.

Figure 1:
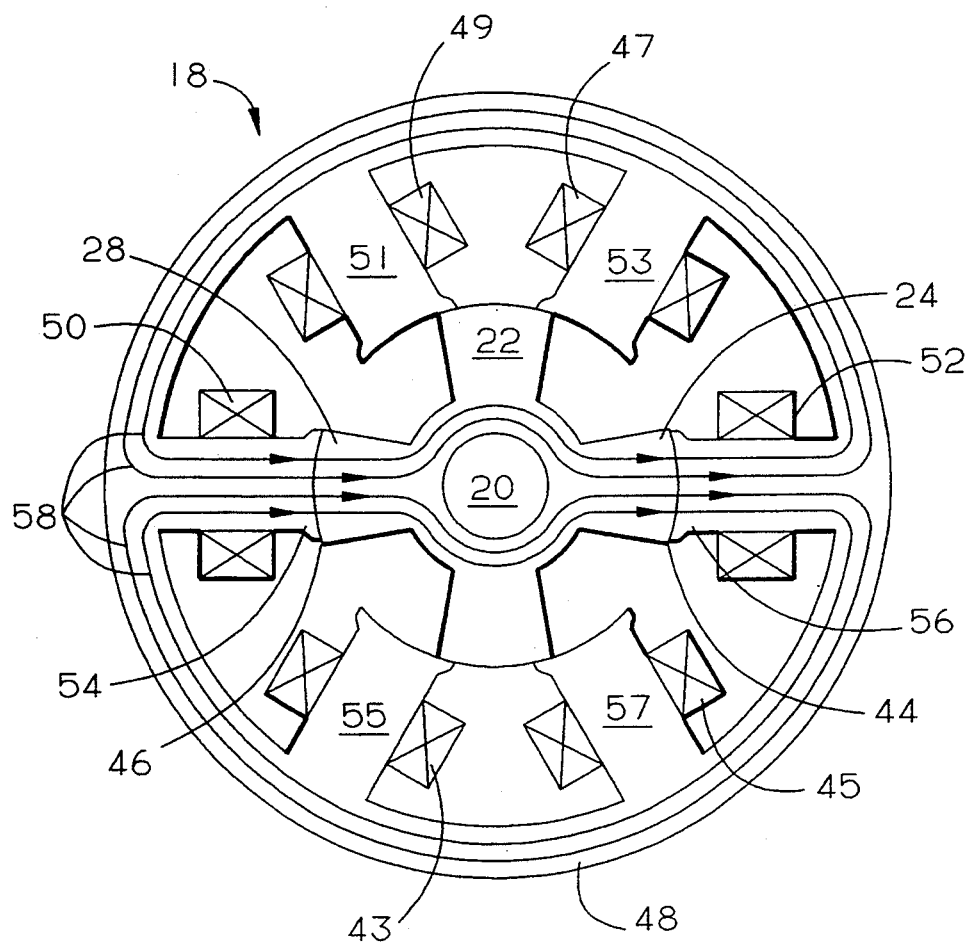
FIG. 1 is a cross-sectional view of a switched reluctance machine.
Figure 2:
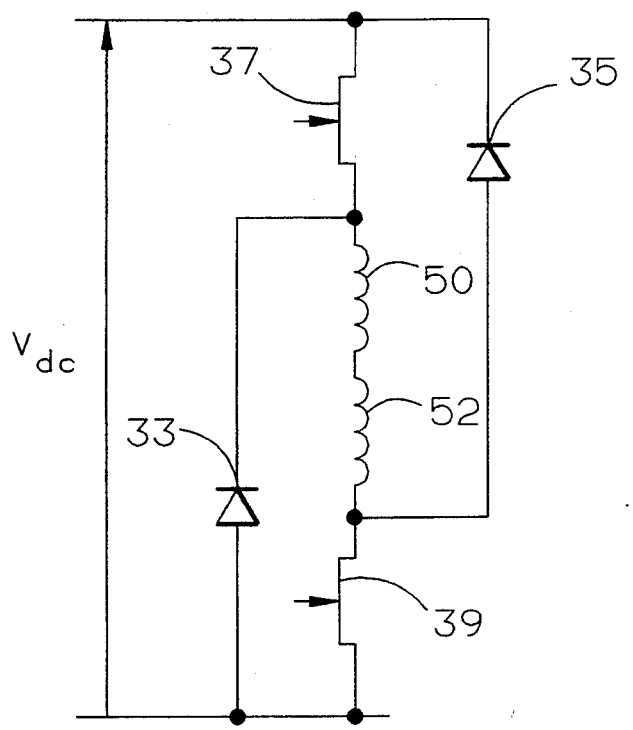
FIG. 2 is an electrical schematic of a series connected stator phase winding pair for a switched reluctance machine and its associated drive circuitry.
Figure 3:
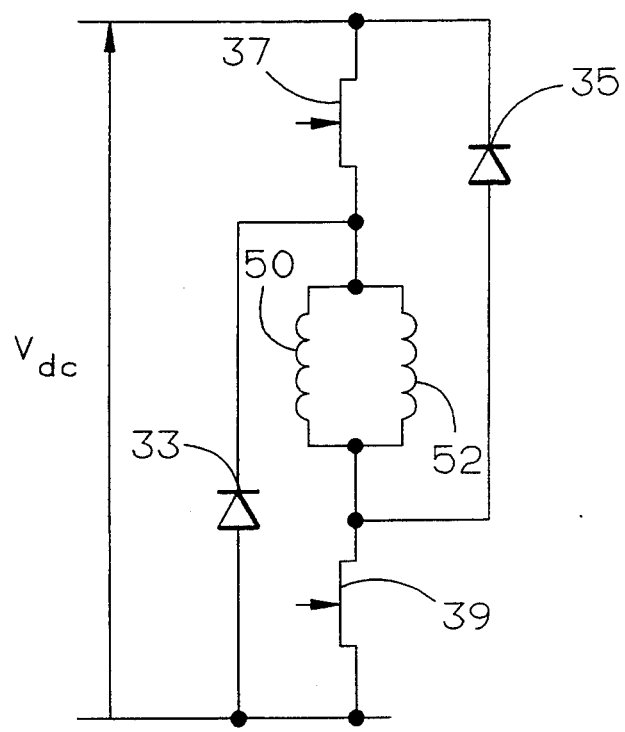
FIG. 3 is an electrical schematic of a parallel connected stator phase winding pair for a switched reluctance machine and its associated drive circuitry.
Figure 4:
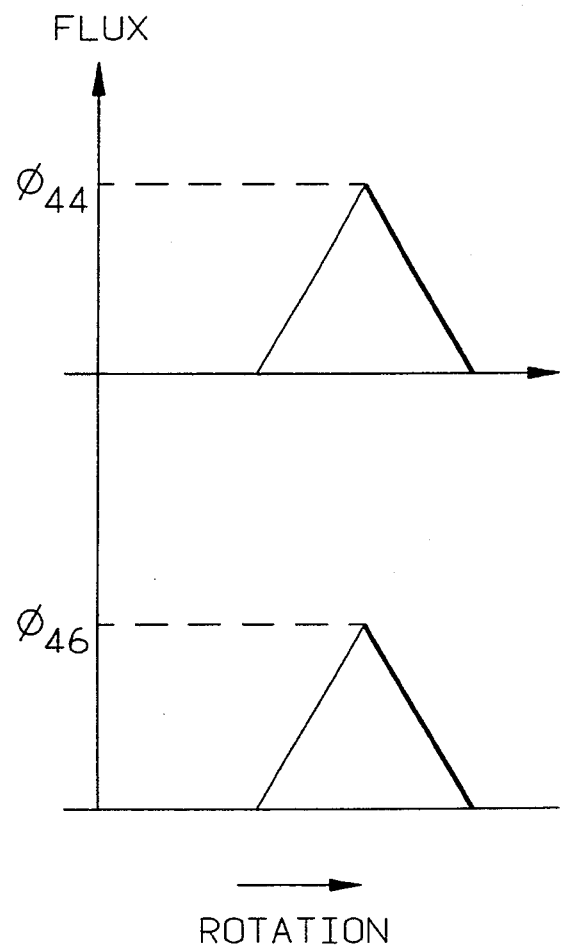
FIG. 4 is a graphical representation of the flux crossing the air gap of a selected set of stator pole pairs.
Figure 5:
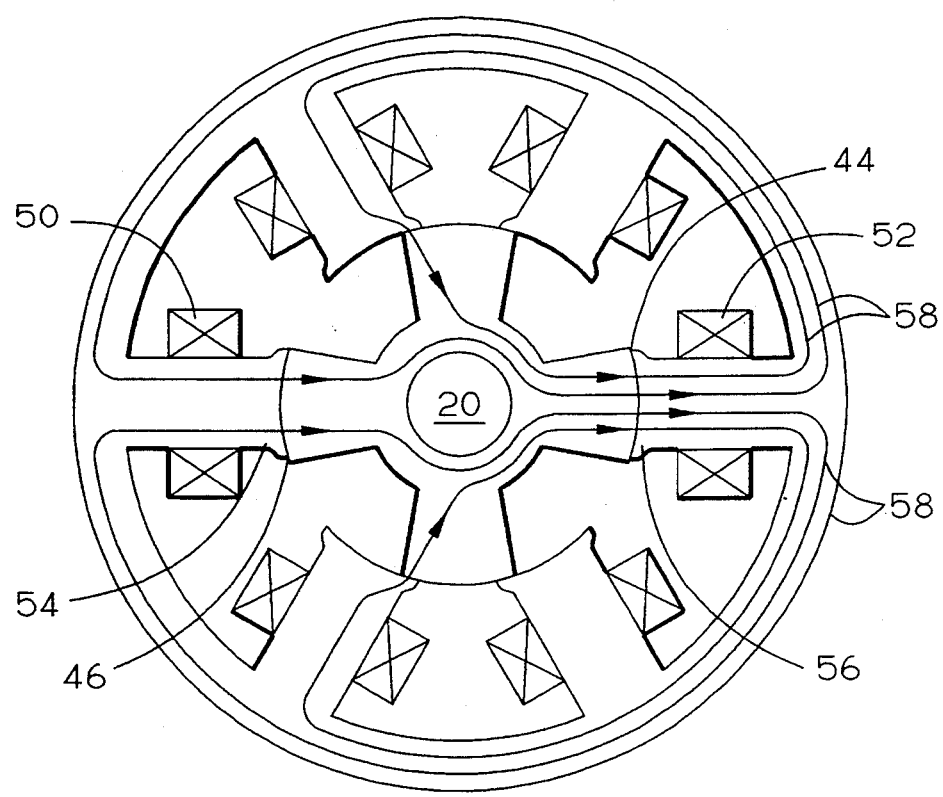
FIG. 5 is a cross-sectional view of a switched reluctance machine having a faulted stator phase winding illustrating the lines of flux flowing therein.
Figure 6:
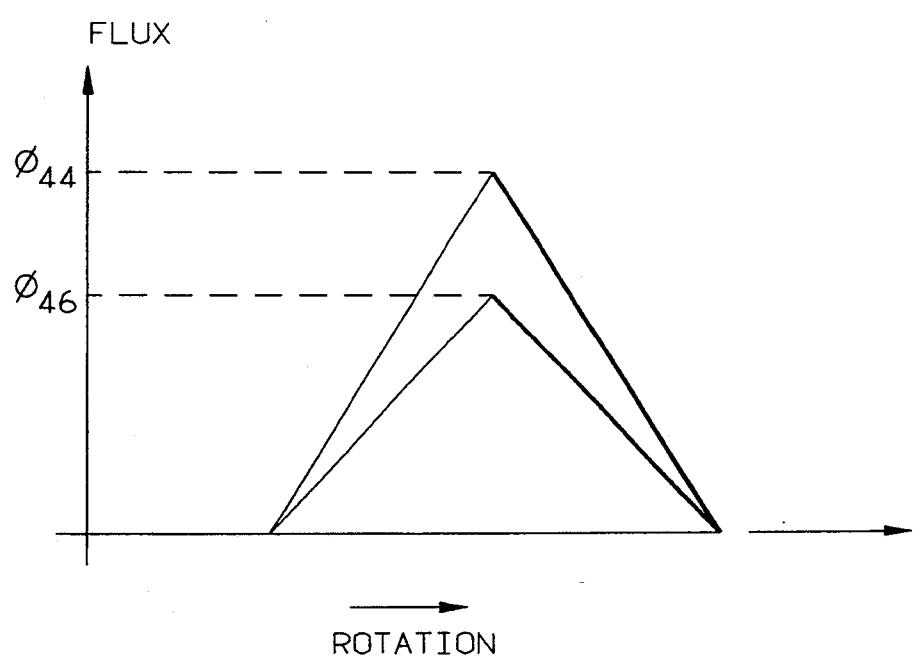
FIG. 6 is a graphical representation of the flux crossing the air gap of a selected set of stator pole pairs with a faulted stator phase winding.
Figure 7:
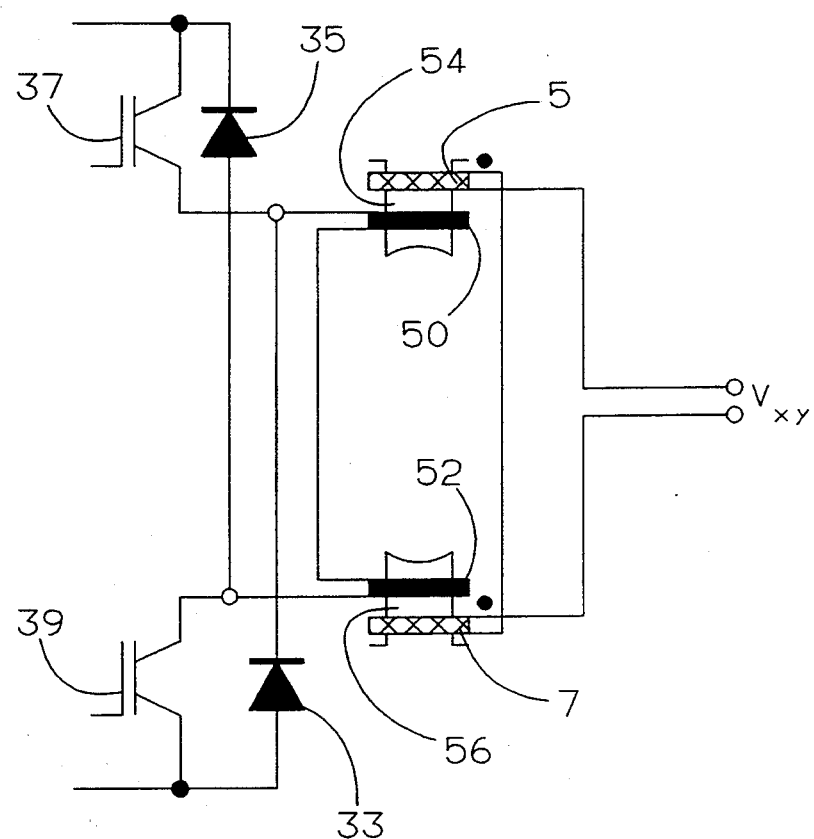
FIG. 7 is an electrical schematic of a prior art fault sensing circuit using differential voltage sensing with search coils.
Figure 8:
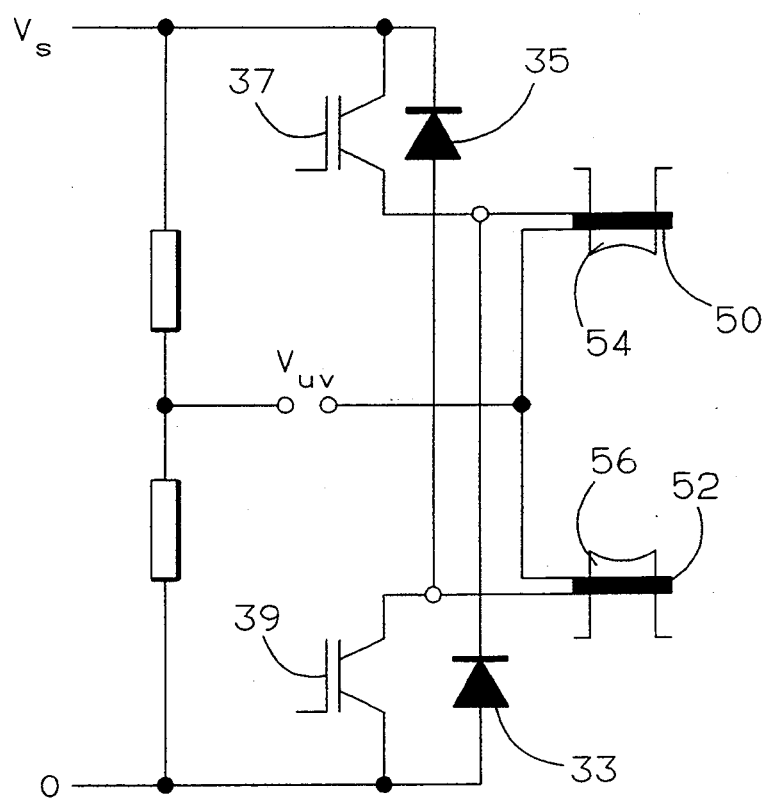
FIG. 8 is an electrical schematic of a prior art fault sensing circuit using differential voltage sensing without search coils.

As described above and illustrated schematically in FIG. 5 and graphically in FIG. 6, the flux distribution loses its symmetry and the amount of flux crossing the air gap under the diametrically opposite poles is asymmetrical. As stated above, this condition leads to an unbalance of the magnetic pull and consequently to a resultant force on the rotor of the switched reluctance machine. This periodic unbalance force, in addition to any inherent mechanically imbalance inherent in the machine, if left to continue will cause a total machine failure.

Figure 10:
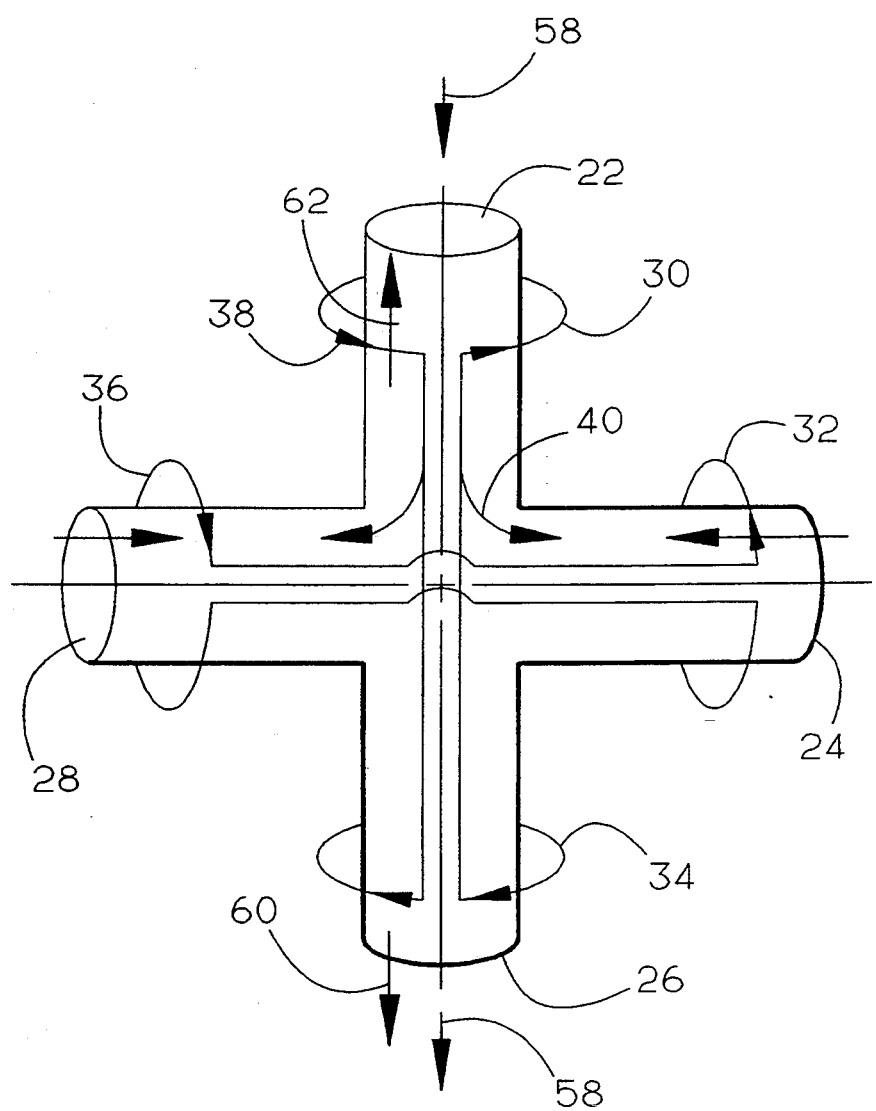
FIG. 10 is a flux flow diagram illustrating operation of the instant invention.

In a switched reluctance machine built in accordance with the preferred embodiment of the instant invention, however, this problem is overcome. The compensation coils 30, 32, 34 and 36, as coupled into compensation pairs 30 & 34, and 32 & 36, will, by induction effect, balance the flux distribution under the faulted stator pole pair. As the rotor 20 rotates, the rate of change of flux seen by the two connected compensation coils 30 and 34 is not equal due to the stator winding fault. The induced electromotive force in each compensation coil 30 and 34 of the compensation pair is different. This difference in the electromotive forces induced at either end of the compensation pair 30 & 34 generates a current flow 38 as illustrated in FIG. 10. This current flow 38 will generate a flux 62 which opposes the stator winding generated flux 58 which will somewhat demagnetize the pole 22 under the non-faulted stator winding. This same current flow 38 will generate a flux 60 which aligns with the stator winding generated flux 58 flowing in the diametrically opposed pole 26. This flux 60 will somewhat magnetize the pole 26 under the faulted stator winding. This combined action by the compensation pair 30 & 34 will reduce the difference between the magnetic pull between the opposite poles of the excited phase. As can be seen from FIG. 10, the compensation pairs 32 & 36 also reduce the leakage fluxes 40 in the adjacent unexcited poles 24 and 28, and consequently, the side forces.

Figure 11:
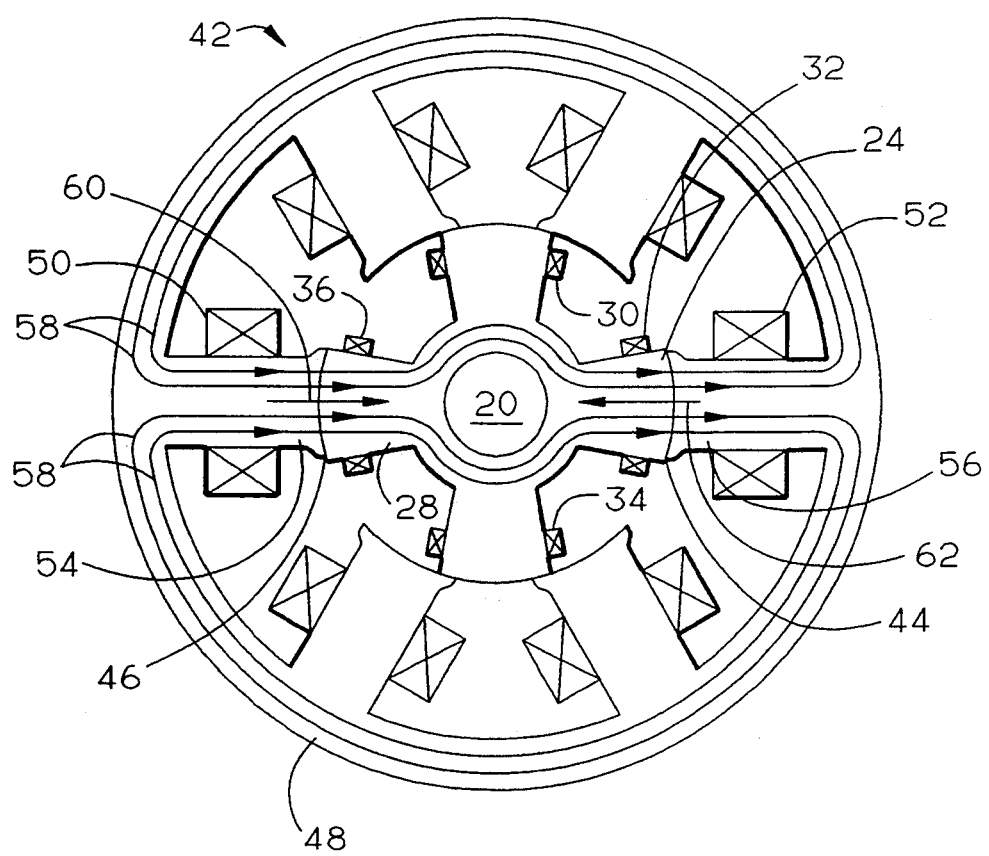
FIG. 11 is a cross-sectional view of a switched reluctance machine having a faulted stator phase winding illustrating the lines of flux flowing therein operating in accordance with the instant invention.

FIG. 11 illustrates a switched reluctance machine 42 having the same fault as illustrated in FIG. 5, that is an open or shorted stator winding 50 and a non-faulted stator winding 52 disposed on diametrically opposed stator poles 54 and 56 forming a stator pole pair. Unlike the switched reluctance machine of FIG. 5 however, the switched reluctance machine 42 of FIG. 11 is built in accordance with the instant invention, including compensation coils 30, 32, 34, and 36 being coupled one to another to form diametrically opposed compensation pairs 30 & 34 and 32 & 36. During operation, the stator windings 50, 52, etc. are coupled by means, such a wires and terminal connectors or other coupling means as are known in the art, to an external source of electrical energy. The machine 42 is then driven by a controller using control techniques as are also known in the art. As illustrated in FIG. 11, the flux distribution, as represented by lines 58 for the stator winding generated flux and by lines 60 and 62 for the compensation coil generated flux, is symmetrical across the air gaps 44 and 46 defined between the outside diameter of the rotor poles 24 and 28 and the inside diameter of the stator's 48 poles 56 and 54. This symmetrical flux distribution, as stated above, reduces the difference between the magnetic pull between the opposite poles of the excited phase and allows the machine 42 to continue to operate without risk of total machine failure. This significantly increases the fault tolerance of the machine.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. As will readily apparent to one skilled in the art from the foregoing description of the best mode of carrying out the invention, application of compensation coils, as described above, to the rotor of any switched flux type or shaded pole induction machine will overcome the problem of asymmetrical flux distribution across diametrically opposed poles creating unbalance forces, and the scope of the invention is not to be limited to the best mode described herein. The details of the structure may be varied substantially without departing from the spirit of the invention, and the exclusive use of all modifications which come within the scope of the appended claims is reserved.

I claim:

1. A switched reluctance machine, comprising:
   a stator having an even plurality of salient stator poles forming an inside diameter, each of said salient stator poles having a stator winding disposed thereon and electrically coupled one to another to form diametrically opposed pole pairs, said stator further having means for coupling each of said diametrically opposed pole pairs to an external source of electrical energy;
   a rotor rotatably positioned within said inside diameter of said stator, said rotor having an even plurality of salient rotor poles forming an outside diameter, and where said outside diameter of said rotor and said inside diameter of said stator defines an air gap therebetween; and
   at least one compensation coil disposed on each of said rotor poles, said compensation coils being electrically coupled one to another to form diametrically opposed compensation pairs.

2. The switched reluctance machine of claim 1, wherein said diametrically opposed pole pairs, when coupled to an external source of electrical energy, generate a magnetomotive force which produces a symmetrical flux distribution from the one of said stator poles of said excited pole pair, across said air gap to one of said rotor poles, through said compensation coil associate therewith, through said rotor to a diametrically opposed rotor pole, through said diametrically opposed compensation coil associated therewith, across said air gap to said diametrically opposed stator pole of said excited pole pair, and wherein said symmetrical flux flowing through said compensation pair generates balanced electromotive forces in each of said compensation coils of said compensation pair thereby having no effect on said symmetrical flux distribution.

3. The switched reluctance machine of claim 2, wherein an excited pole pair having a faulted stator winding produces a non-symmetrical flux distribution through said compensation pair, said non-symmetrical flux distribution generating unequal electromotive forces in each of said compensation coils of said compensation pair resulting in a current flow in said compensation pair.

4. The switched reluctance machine of claim 3, wherein said current flow generates a flux which increases a first magnetic attraction between a stator pole of said excited pole pair having said faulted stator winding disposed thereon and a rotor pole aligning therewith, and wherein said current flow further generates a flux which decreases a second magnetic attraction between a stator pole of said excited pole pair having a non-faulted stator winding disposed thereon and a rotor pole aligning therewith.

5. The switched reluctance machine of claim 4, wherein a resultant first magnetic attraction and a resultant second magnetic attraction are approximately equal.

6. The switched reluctance machine of claim 1, wherein said compensation coils are disposed at a radially outer position of said rotor poles.

7. The switched reluctance machine of claim 1, wherein each of said compensation coils comprise a single winding around an axial length of an associated rotor pole.

* * * * *